United States Patent [19]

Makino et al.

[11] Patent Number: 4,690,873
[45] Date of Patent: Sep. 1, 1987

[54] GAS SEPARATING MATERIAL

[75] Inventors: Hiroshi Makino; Masayuki Nakatani, both of Ichihara, Japan

[73] Assignee: Ube Industries, Ltd., Yamaguchi, Japan

[21] Appl. No.: 800,981

[22] Filed: Nov. 22, 1985

[30] Foreign Application Priority Data

Nov. 30, 1984 [JP] Japan .................................. 59-251613

[51] Int. Cl.$^4$ ...................... B32B 27/00; B32B 27/02; B01D 53/22
[52] U.S. Cl. ...................... 428/473.5; 55/16; 55/158; 210/500.1; 210/500.21; 210/500.23; 210/500.39; 428/220
[58] Field of Search ............................. 428/473.5, 220; 210/500.2, 500.1, 500.21, 500.23, 500.39; 55/16, 158

[56] References Cited

U.S. PATENT DOCUMENTS 4,378,400 3/1983 Makino et al. .................. 428/473.5
4,528,004 7/1985 Makino et al. .................. 428/220 X Primary Examiner—Thomas J. Herbert
Attorney, Agent, or Firm—Burgess, Ryan and Wayne

[57] ABSTRACT

A gas separating material having excellent $CO_2$ gas permeating property, mechanical property, and heat resistance has a gas separating layer comprising an aromatic imide polymer which contains 20 to 100 molar % of recurring units of the formula (I):

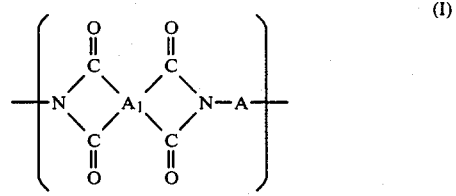

wherein $A_1$ is a tetravalent aromatic radical, A is a divalent aromatic radical of the formula (II):

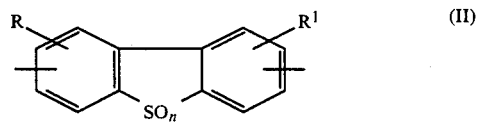

in which R and $R^1$ are H or an organic radical, for example, $-CH_3$, $-C_2H_5$, $-C_3H_7$, or $-CH_2OH$, and n is 0, 1, or 2.

8 Claims, No Drawings

GAS SEPARATING MATERIAL

BACKGROUND OF THE INVENTION

1. Field of the Invention

The present invention relates to a gas separating material. More particularly, the present invention relates to a gas separating material useful for separating a mixed gas consisting of a plurality of component gases, for example, carbon dioxide gas and methane gas or carbon dioxide gas and nitrogen gas, into the component gases, or for concentrating a specific component gas from the mixed gas.

2. Description of the Related Art

It is known that various aromatic imide polymer membranes are usable as a gas separating material. For example, Japanese Unexamined Patent Publication (Kokai) No. 57-15819 and U.S. Pat. No. 4,378,400 disclose gas separating material having a gas-separating layer consisting of an aromatic imide polymer derived from a biphenyl tetracarboxylic acid and an aromatic diamine, for example, diaminodiphenylether, diaminodiphenyl thioether, diaminodiphenyl methane, or diaminobenzophenone.

However, it is also known that conventional gas separating materials having the aromatic imide polymer layer exhibit a low permeability coefficient of carbon dioxide gas and therefore, are unsatisfactory for separating or concentrating carbon dioxide gas from the mixture gas containing carbon dioxide gas.

Generally, aromatic imide polymer has an excellent heat-resisting property, a superior chemicalresisting property, and satisfactory mechanical properties. Accordingly, it is strongly desired by industry to provide an aromatic imide polymer gas separating material useful for separating and concentrating carbon dioxide gas.

SUMMARY OF THE INVENTION

An object of the present invention is to provide a gas separating material having a gas separating layer comprising an aromatic imide polymer and exhibiting a high permeability coefficient of carbon dioxide gas.

The above object is accomplished by the gas separating material of the present invention which has a gas separating layer comprising at least one aromatic imide polymer containing at least 20 molar % of at least one type of recurring unit of the formula (I):

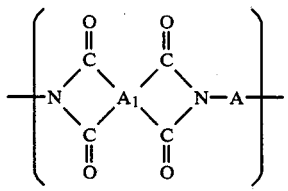

(I)

wherein $A_1$ represents a tetravalent aromatic radial, A represents a divalent aromatic radical of the formula (II):

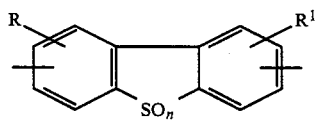

(II)

in which R and $R^1$ respectively represent, independently from each other, a member selected from the group consisting of a hydrogen atom and organic radicals, and n represents zero or an integer of 1 to 2.

The aromatic imide polymer optionally contains, in addition to the recurring unit of the formula (I), 80 molar % or less of the recurring unit of the formula (III):

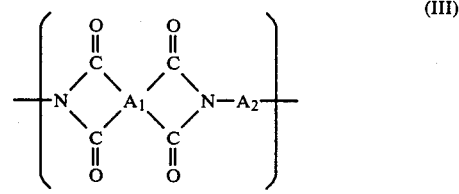

(III)

wherein $A_1$ is the same as defined above and $A_2$ is a divalent aromatic radical different from A represented by the formula (II).

DESCRIPTION OF THE PREFERRED EMBODIMENTS

It was found by the inventors of the present invention that a specific novel aromatic imide polymer prepared by the polymerization and imidization of an aromatic tetracarboxylic acid component and an aromatic diamine component containing a diaminodiphenylene compound containing sulfur exhibits a high permeability coefficient of carbon dioxide and is useful for separating, refining, and concentrating carbon dioxide gas from a gas mixture containing carbon dioxide.

Also, the specific aromatic imide polymer layer exhibits a high selectivity in separating other gases, for example, oxygen, hydrogen water vapor, hydrogen sufide, sulfur dioxide, and nitrogen dioxide, from each other, and therefore, is useful for separating, refining and concentrating the above-mentioned gases from mixture gases containing them.

In the gas separating material of the present invention, the gas separating layer comprises at least one aromatic imide polymer containing at least 20 molar % of at least one type of recurring unit of the formular (I):

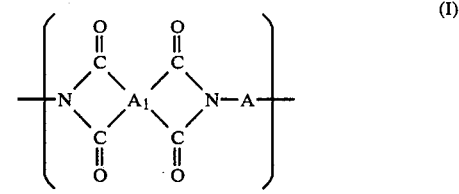

(I)

wherein $A_1$ represents a tetravalent aromatic radical, and A represents a divalent aromatic radical of the formula (II):

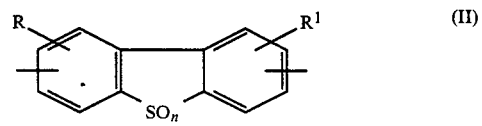

(II)

wherein R and $R^1$ respectively represent, independently from each other, a member selected from the group consisting of a hydrogen atom and organic radicals, and n represents zero or an integer of 1 to 2.

The aromatic imide polymer of the present invention optionally contains, in addition to the recurring unit of the formula (I), 80 mole % or less of recurring unit of the formula (III):

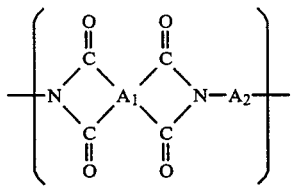
(III)

wherein $A_1$ is the same as defined above and $A_2$ represents a divalent aromatic radical different from A represent by the formula (II).

In the recurring unit of formula (I) of the present invention, the divalent aromatic radical A of the formula (II) is perferably selected from the those of the formulae (IV) and (V):

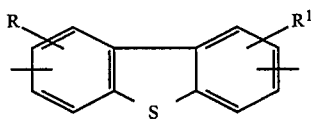
(IV)

and

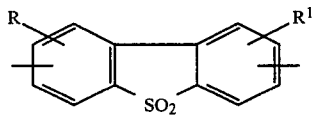
(V)

In the formulae (II), (IV), and (V), R and $R^1$ respectively represent, independently from each other, a member selected from the group consisting of a hydrogen atom and organic radicals, for example, hydrocarbon radicals having 1 to 6 carbon atoms and alkoxyl radicals having 1 to 6 carbon atoms. The hydrocarbon radicals include alkyl, alkylene, and aryl radicals. The preferred hydrocarbon radicals are methyl, ethyl, and propyl radicals.

The aromatic imide polymer of the present invention is prepared by the polymerization and imidization of an acid component consisting of at least one aromatic tetracarboxylic acid or its derivative, for example, dianhydride, acid chloride, ester, or salt, with an amine component consisting of at least one aromatic diamine in an approximately equal molar amount to that of the acid component, in accordance with any conventional method.

The aromatic tetracarboxylic acid usable for the preparation of the aromatic imide polymer of the present invention is preferably selected from biphenyl tetracarboxylic acids, for example, 3,3',4,4'-biphenyl tetracarboxylic acid, and 2,3,3',4'-biphenyl tetracarboxylic acid; benzophenone tetracarboxylic acids, for example, 3,3',4,4'-benzophenone tetracarboxylic acid and 2,3,3'4'-benzophenone tetracarboxylic acid; pyromellitic acid; and dianhydrides and lower alcohol esters of the above-mentioned tetracarboxylic acids.

It is preferable that the acid component contain 50 to 100 molar % of at least one biphenyl tetracarboxylic acid compound, because it is effective for obtaining an aromatic imide polymer which exhibits a high solubility in organic solvents such as phenolic compounds and, therefore, which is easily converted to a stable dope solution useful for the preparation of an aromatic imide polymer gas separating layer.

The amine component for the aromatic imide polymer of the present invention contains 20 to 100 molar %, preferably 40 to 100 molar %, of at least one diaminodiphenylene compound containing sulfur of the formula (VI):

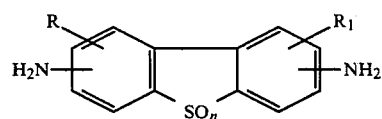
(VI)

and 0 to 80 molar % preferably 0 to 60 molar %, of at least one other aromatic diamine compound of the formula (VII):

(VII)

in which formulae (VI) and (VII), A and $A_2$ are the same as defined above.

The aromatic diamine of the formula (VI) is preferably selected from the group consisting of diaminodibenzothiophenes (diaminodiphenylene sulfide) of the formula (VIII):

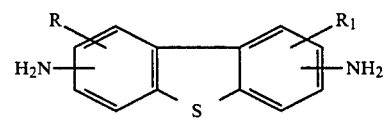
(VIII)

and diaminodiphenylene sulfones of the formula (IX):

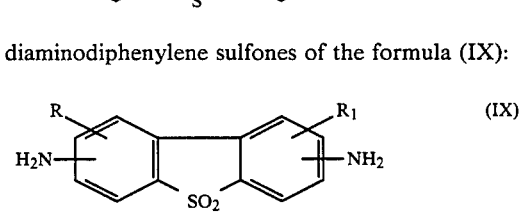
(IX)

wherein R and $R^1$ are the same as defined above.

The diaminodibenzothiophene of the formula (VIII) is preferable selected from 3,7-diamino-2,8-dimethyldibenzothiophene, 2,8-diamino-3,7-dimethyldibenzothiophene, 3,7-diamino-2,6-dimethyldibenzothiophene, and 3,7-diamino-2,8-diethyldibenzothiophene.

The diaminodiphenylene sulfone of the formula (IX) is preferably selected from 3,7-diamino-2,8-dimethyldiphenylene sulfone, 3,7-diamino-2,8-diethyldiphenylene sulfone, 3,7-diamino-2,8-dipropyldiphenylene sulfone, 2,8-diamino-3,7-dimethyldiphenylene sulfone and 3,7-diamino-2,8-dimethoxydiphenylene sulfone.

The other aromatic diamino compounds of the formula (VII) include diaminodiphenyl ether compounds, for example, 4,4'-diaminodiphenyl ether, 3,3'-dimethyl-4,4'-diaminodiphenyl ether, 3,3'-dimethoxy-4,4'-diaminodiphenyl ether and 3,3'-diaminodiphenyl ether; diaminodiphenyl diphenyl methane compounds, for example, 4,4'-diaminodiphenyl methane and 3,3'-diaminodiphenyl methane; diamino-bibenzyl compounds, for example, 4,4'-diaminobibenzyl and 4,4'-diamino-2,2'-dimethyl-bibenzyl; diaminobenzophenone compounds, for example, 4,4'-diaminobenzophenone and 3,3'-diaminobenzophenone; 2,2-bis(aminophenyl) propane compounds, for example, 2,2bis-(4-aminophenyl) propane, 2,2-bis (3-aminophenyl) propane and 2,2-bis [4-(4'-aminophenoxy) phenyl]-propane; benzidine compounds, for example, 3,3'-dimethylbenzidine and 3,3'-dimethoxybenzidine; o, m, and p-phenylene diamines; 3,5-diaminobenzoic acid; and 2,6-diaminopyridine.

The aromatic imide polymer gas separating layer of the present invention can be prepared by dissolving the aromatic polyamic acid or aromatic imide polymer prepared from the above-mentioned aromatic tetracarboxylic acid component and the aromatic diamine component, in an organic solvent, by converting the resultant dope solution into a desired form of layer and by removing the solvent from the dope solution layer by means of evaporation (dry membrane-forming method) or coagulation (wet membrane-forming method in which the dope solution layer is brought into contact with a coagulation liquid). The resultant membrane may be in the form of a flat film or a hollow fiber.

The processes for the preparation of the aromatic imide polymer membrane will be explained in detail below.

(A) Preparation of membrane from an imide polymer solution

A mixture of the aromatic tetracarboxylic acid component and the specific aromatic diamine component as mentioned above in an approximately same molar amount as each other was dissolved in an organic solvent consisting of a phenolic compound. The resultant reaction mixture was subjected to one step polycondensation-imidization process at a temperature of 140° C. or more. The resultant aromatic imide polymer which is soluble in the organic solvent is used to provide a dope solution containing about 3% to 30% by weight of the imide polymer. The dope solution is spread or coated on a substrate surface at a temperature of about 30° C. to 150° C. The resultant thin dope solution layer is solidified by gradually evaporating the solvent therefrom and the resultant membrane was dried and heat-treated at a temperature of 150° C. to 400° C., preferably from 170° C. to 350° C. A dense aromatic imide polymer membrane is obtained.

(B) Preparation of membrane from polyamic acid solution

The same reaction mixture as that described above is subjected to a polymerization procedure at a temperature of 100° C. or less, preferably 60° C. or less. The resultant polyamic acid is used as a dope solution of about 3% to 30% by weight in an organic solvent. The dope solution is spread or coated on a substrate surface at a temperature of from about 10° C. to 100° C. to form a thin dope solution layer. The organic solvent is removed from the dope solution layer by means of gradual evaporation. The solidified polyamic acid layer was heated to a temperature of from about 150° C. to 350° C. to convert the polyamic acid to the corresponding imide polymer having the recurring unit of the formula (I) and optionally the other recurring unit of the formula (III) in a desired proportion, and then is completely dried and heat-treated at the above-mentioned temperature. A dense aromatic imide polymer membrane is obtained.

In the above-mentioned processes for the preparation of the dense aromatic imide polymer membrane, the dry-heat treatment procedure should be carried out at a temperature at which the aromatic imide polymer is not melted or heat-decomposed. Usually, the dry-heat treatment is carried out preferably at a temperature of about 180° C. to 350° C. for about 0.5 to 10 hours. This dry-heat treatment is highly effective for significantly enhancing the gas-separating activity of the dense membrane.

In the preparation of the dense aromatic imide polymer membrane, the substrate consisting of a material having a smooth surface, for example, glass plate, copper plate, or other metal sheet or belt is used to provide a thin layer of the dope solution. After the dope solution layer is solidified, the resultant aromatic imide polymer membrane is peeled from the substrate surface.

The resultant thin dense membrane per se can be used as a gas separating material. Otherwise, the thin dense membrane is laminated on or combined with one or more other porous membranes.

When the dope solution is spread or coated on a substrate consisting of a porous film, and is converted to a dense membrane on the porous film substrate, the resultant composite film consisting of the porous film and the dense membrane firmly adhered to thereto is useful as a gas separating composite membrane.

In the preparation of the dense membrane, it is preferable that the aromatic imide polymer to be used exhibit a logarithmic viscosity of from 0.1 to 7, more preferably 0.2 to 5, determined in a solution of 0.5 g of the polymer in 100 ml of a solvent consisting of 4 parts by volume of p-chlorophenol and 1 part by volume of o-chlorophenol at a temperature of 30° C. The logarithmic viscosity of the polymer solution closely corresponds to the degree of polymerization or molecular weight of the polymer.

When the aromatic polyamic acid is used, it is preferable that the polyamic acid exhibit a logarithmic viscosity of about 0.1 to 7, more preferably, 0.2 to 7 determined in a solution of 0.5 g of the polyamic acid in 100 ml of a solvent consisting of N-methyl-2-pyrrolidone at a temperature of 30° C.

The logarithmic viscosity of a polymer is calculated in accordance with the following equation.

$$\text{Logarithmic viscosity} = \frac{\text{Natural logarithm}\left(\frac{\text{Viscosity of polymer solution}}{\text{Viscosity of solvent}}\right)}{\text{Concentration of polymer in solution}}$$

The organic solvent usable for the preparation of the aromatic imide polymer and for the dope solution thereof preferably consists of at least one phenolic compound, for example, phenol, cresol, monohalogenated phenol or monohalogenated monoalkylphenol.

The organic solvent usable for the preparation of the polyamic acid and for the dope solution of the polyamic acid preferable consists of at least one member selected from N-methyl-2-pyrrolidone, N,N-dimethyl acetamide, N,N-dimethyl formamide, dimethyl sulfoxide, and tetramethyl urea.

In the gas separating material of the present invention, the larger the thickness of the aromatic imide polymer layer, the smaller the gas-permeating rate of the aromatic imide polymer layer. Accordingly, for practical use, it is preferable that the thickness of the aromatic imide polymer layer be 20 $\mu$m or less.

The gas-permeating rate of the gas separating material is represented by a gas permeability coefficient ($cm^3 \cdot cm/cm^2 \cdot sec \cdot cmHg$) which is calculated in accordance with the equation:

Permeability coefficient =

$$\frac{X \times Th}{A \times T \times D} \text{ (cm}^3 \cdot \text{cm/cm}^2 \cdot \text{sec} \cdot \text{cmHg)}$$

wherein X represents an amount in cm³ STP of gas passed through the film, Th represents a thickness in cm of the film, A represents an area in cm² of the film through which the gas passed, T represents a time in seconds during which the gas passed through the film, and D represents a difference between the pressures in cmHg of the gas before and after it passed through the film.

The gas separating material of the present invention exhibits a specifically high gas permeability coefficient of carbon dioxide gas. Accordingly, the gas separating material of the present invention is highly useful for separating, refining and concentrating carbon dioxide gas from a mixture gas containing it. Also, the gas separating material of the present invention is useful for concentrating hydrogen gas from a mixture of hydrogen gas and carbon monoxide gas at an elevated temperature, because the gas separating material has an excellent heat resistance.

The specific examples presented below will serve to more fully elaborate how the present invention can be practically used. However, it should be understood that the examples are only illustrative and in no way will limit the scope of the present invention.

In the following examples and comparative examples, the gas-permeating test for the gas separating materials was carried out as follows.

A gas-separating material to be tested was fixed on a cell having a gas-permeating area of 14.65 cm² an made of a stainless steel. A mixed gas containing, for example, carbon dioxide, methane, nitrogen, oxygen, hydrogen, and/or carbon monoxide, was supplied into the inlet side of the gas-separating material at a temperature of 30° C. under a pressure of 2 kg/cm², while the pressure in the outlet side of the gas-separating material was reduced, and the volume of gas passed through the cell was measured by using a gas-chromatographic analyzer.

EXAMPLE 1

A separable flask with a stirrer and conduit for introducing thereinto nitrogen gas, was charged with a mixture of 30 millimoles of 3,3',4,4'-biphenyl tetracarboxylic dianhydride (BPDA), 30 millimoles of a mixture of diaminodimethlydiphenylene sulfone (AMPS) isomers, and 138 g of a solvent consisting of p-chlorophenol. The mixture of AMPS isomers consist of 75 molar % of 3,7-diamino-2,8-dimethyldiphenylene sulfone, 23 molar % of 3,7-diamino-2,6-dimethyldiphenylene sulfone, and 2 molar % of 3,7-diamino-4,6-dimethyl diphenylene sulfone.

The reaction mixture was subjected to a one-step polymerization-imidization procedure while the mixture was stirred and nitrogen gas flowed through the conduit and the flask. The mixture was heated from room temperature to 180° C. in about 60 minutes and was maintained at 180° C. for about 40 hours. A viscous solution of the resultant aromatic imide polymer in a concentration of about 10% by weight was obtained.

The imide polymer solution was filtered under pressure and was degased to provide a refined dope solution. The dope solution was spread on a surface of a glass plate placed in a film-forming apparatus and the thickness of the resultant dope solution layer was uniformly adjusted to about 0.2 mm by means of a doctor blade. The thin dope solution layer was maintained at a temperature of 100° C. for 3 hours while nitrogen gas flows through the film-forming apparatus, to gradually evaporate and remove the solvent from the thin layer. Then, the resultant solid layer was heated from room temperature to 300° C. over about 1 hour and was maintained at this temperature for 1 hour to heat treat it. A dense film having a thickness of 10 μm was obtained.

The dense film exhibited a tensile strength of 25 kg/mm², an ultimate elongation of 30%, and a initial modulus of elasticity of 550 kg/mm².

The dense film was subjected to the gas-permeating test. The result is shown in Table 1.

EXAMPLE 2

The same procedures as those described in Example 1 were carried out, except that the diaminodimethyldiphenylene sulfone isomer mixture was replaced by a mixture of diaminodiethyldiphenylene sulfone (AEPS) isomers, which mixture consisted of 72 molar % of 3,7-diamino-2,8-diethyl-diphenylene sulfone, 25 mole % of 3,7-diamino-2,6-diethyl-diphenylene sulfone, and 3 molar % of 3,7-diamino-4,6-diethyl-diphenylene sulfone.

The resultant dense polymer film exhibited a tensile strength of 28 kg/mm², an ultimate elongation of 50%, and an initial modulus of elasticity of 450 kg/mm². The results of the gas-permeating test are shown in Table 1.

EXAMPLES 3 and 4

In each of Examples 3 and 4, the same procedures as those described in Example 1 were carried out except that the aromatic diamine component consisted in Example 3, of 15 millimoles of 4,4'-diaminodiphenyl ether (DADE) and 15 millimoles of the same AMPS isomer mixture as that described in Example 1 and, in Example 4, of 15 millimoles of DADE and 15 millimoles of the same AEPS isomer mixture as that mentioned in Example 2.

The resultant dense film exhibited the gas-permeating properties as shown in Table 1.

EXAMPLES 5 to 7

In each of Example 5 and 7, the same procedures as those described in Example 3 were carried out except that the tetracarboxylic acid component consisted, in Example 5, of 15 millimoles of BPDA and 15 millimoles of 3,3',4,4'-benzophenonetetracarboxylic dianhydride (BTDA), in Example 6, of 15 millimoles of BPDA and 15 millimoles of pyromellitic dianhydride (PMDA), and, in Example 7, of 30 millimoles of BTDA.

The gas-permeating properties of the resultant dense film are shown in Table 1.

COMPARATIVE EXAMPLE 1

The same procedures as those described in Example 1 were carried out except that the diamine component consisted of 4,4'-diaminodiphenyl ether (DADE) in place of AMPS.

The resultant comparative dense film exhibited the gas-permeating properties as shown in Table 1.

EXAMPLE 8

The same flask as described in Example 1 was charged with 30 millimoles of BPDA, 30 millimoles of AMPS, and 138 g of N-methyl-2-pyrrolidone (NMP). While flowing nitrogen gas through the flask, the resultant mixture was simultaneously stirred at a constant temperature of 25° C. for about 20 hours. A solution containing about 10% by weight of the resultant polyamic acid was obtained. The polyamic acid had a logarithmic viscosity of 0.3 determined in a solution of 0.5 g of the polyamic acid in 100 ml of NMP at a temperature of 30° C.

The polyamic acid solution was filtered under pressure and degased to prepare a refined dope solution. The dope solution was spread on a glass plate surface. The thickness of the resultant dope solution layer was evenly adjusted to about 0.2 mm by means of a doctor blade.

The thin dope solution layer was maintained at a temperature of about 100° C. in nitrogen flow for 3 hours to gradually evaporate and remove the solvent. The resultant solid film was heated from room temperature to 300° C. by spending about 1 hour and was maintained at 300° C. for 1 hour to imidize the polyamic acid and to dry and heat treat the resultant imide polymer film. The resultant dense imide polymer film had a thickness of about 5 μm and exhibited the gas-permeating properties as indicated in Table 1.

EXAMPLE 9

The same procedures as those described in Example 8 were carried out except that BPDA as the tetracarboxylic acid component was replaced by 30 millimoles of pyromellitic dianhydride.

The resultant dense imide polymer film exhibited the gas-permeating properties as indicated in Table 1.

COMPARATIVE EXAMPLE 2

The same procedures as those described in Example 8 were carried out except that the diamine component consisted of 30 millimoles of DADE in place of AMPS.

The resultant comparative dense imide polymer film exhibited the gas-permeating properties as indicated in Table 1.

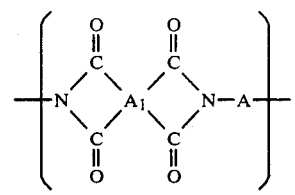
(I)

wherein $A_1$ represents a tetravalent aromatic radical and A represents a divalent aromatic radical of the formula (II):

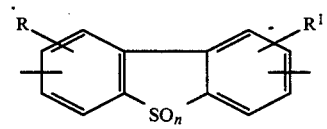
(II)

in which R and $R^1$ respectively represent independently from each other a member selected from the group consisting of a hydrogen atom and organic and organic radicals, and n represents zero or an integer of 1 to 2.

2. The gas separating material as claimed in claim 1, wherein the aromatic imide polymer contains, in addition to the recurring unit of the formula (I), 80 molar % or less of recurring units of the formula (III):

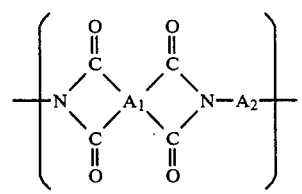
(III)

wherein $A_1$ is the same as defined above, and $A_2$ represents a divalent aromatic radical different from A represented by the formula (II).

TABLE 1

| | Components of imide polymer | | | | | | Gas-permeating test | | | |
|---|---|---|---|---|---|---|---|---|---|---|
| | Aromatic tetracarboxylic acid component | | | Aromatic diamine component | | | Gas permeability coefficient ($\times 10^{-11}$) | | | Selectivity |
| Example No. | BPDA | BTDA | PMDA | AMPS | AEPS | DADE | Carbon ($P_{CO_2}$) | Oxygen ($P_{O_2}$) | Hydrogen ($P_{H_2}$) | $\dfrac{P_{CO_2}}{P_{CH_4}}$ |
| Example | | | | | | | | | | |
| 1 | 30 | — | — | 30 | — | — | 29.0 | 7.7 | 190 | 236 |
| 2 | 30 | — | — | — | 30 | — | 165.0 | — | — | 186 |
| 3 | 30 | — | — | 15 | — | 15 | 19.0 | — | — | 325 |
| 4 | 30 | — | — | — | 15 | 15 | 64.0 | — | — | 149 |
| 5 | 24 | 6 | — | 15 | — | 15 | 13.0 | — | — | 301 |
| 6 | 18 | — | 12 | 15 | — | 15 | 13.0 | — | — | 576 |
| 7 | — | 30 | — | 30 | — | — | 20.1 | — | — | 220 |
| Comparative Example | | | | | | | | | | |
| 1 | 30 | — | — | — | — | 30 | 2.2 | — | — | 92 |
| Example | | | | | | | | | | |
| 8 | 30 | — | — | 30 | — | — | 25.0 | — | — | 228 |
| 9 | — | — | 30 | 30 | — | — | 22.0 | — | — | 147 |
| Comparative Example | | | | | | | | | | |
| 2 | 30 | — | — | — | — | 30 | 1.5 | — | — | 90 |

I claim:

1. A gas separating material having a gas separating layer comprising at least one aromatic imide polymer which contains at least 20 molar % of at least one type of recurring unit of the formula (I):

3. The gas separating material as claimed in claim 1, wherein the divalent aromatic radical A of the formula (II) is selected from those of the formulae:

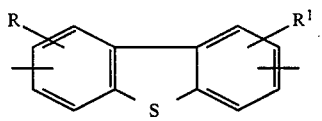

and

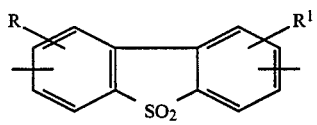

4. The gas separating material as claimed in claim 1 or 3, wherein the organic radicals represented by R and R¹ in the formula (II) are selected from hydrocarbon radicals having 1 to 6 carbon atoms and alkoxyl radicals having 1 to 6 carbon atoms.

5. The gas separating material as claimed in claim 1, which is in the form of a membrane.

6. The gas separating material as claimed in claim 1, which is in the form of a hollow fiber.

7. The gas separating material as claimed in claim 1, wherein the aromatic imide polymer has a logarithmic viscosity of 0.1 to 7 determined in a solution of 5 g of the polymer dissolved in 100 ml of a solvent consisting of 4 parts by volume of p-chlorophenol and 1 part by volume of o-chlorophenol at a temperature of 30° C.

8. The gas separating material as claimed in claim 1, which is useful for separating carbon dioxide gas from a gas mixture.

* * * * *